Patented Mar. 4, 1952

2,587,671

UNITED STATES PATENT OFFICE 2,587,671

REDUCTION OF OXYGENATED THIOPHENE COMPOUNDS

Irving Wender and Milton Orchin, Pittsburgh, Pa.

No Drawing. Application May 15, 1951,
Serial No. 226,520

9 Claims. (Cl. 260—332.8)

(Granted under the act of March 3, 1883, as
amended April 30, 1928; 370 O. G. 757)

The invention herein described and claimed may be manufactured and used by or for the Government of the United States of America for governmental purposes without the payment of royalties thereon or therefor.

This invention relates to the reduction of the oxygen-containing group in certain oxygenated thiophene compounds in the presence of a homogeneous hydrogenation catalyst.

Procedures for the reduction of organic compounds in the presence of heterogeneous hydrogenation catalysts have long been known to have a number of disadvantages and limitations. Many of the more effective hydrogenation catalysts such as Raney nickel are rather expensive and tedious to prepare. Likewise, since the surfaces of heterogeneous hydrogenation catalysts are subject to poisoning by relatively small amounts of impurities, such as by sulfur and carbon monoxide, only pure feed stocks and carefully purified hydrogenating gases can be employed.

When the compound to be reduced itself contains sulfur, the use of a heterogeneous hydrogenation catalyst is usually very unsatisfactory. Thiophene-type compounds, with which this invention is concerned, are particularly noted for their poisoning effect on heterogeneous hydrogenation catalysts.

The object of the present invention is to provide a method for completely reducing the oxygen-containing group in certain oxygenated thiophene compounds in the presence of a homogeneous hydrogenation catalyst which is easily prepared and which is immune to poisoning by sulfur and other poisons which deactivate the surfaces of heterogeneous hydrogenation catalysts. These and other objects of the invention will be apparent from the description which follows.

In accordance with the invention, it has been found that the oxygen-containing group in thiophene aldehydes, thiophene ketones, and thenyl alcohols wherein the oxygen atom of the oxygen-containing group is attached to a carbon atom $\alpha$ to the thiophene nucleus, can be reduced to the completely hydrogenated state when these compounds are reacted with hydrogen in the presence of a carbonyl of cobalt or iron at an elevated temperature and pressure while maintaining a concentration of carbon monoxide in the reaction zone sufficient to prevent the decomposition of the metal carbonyl catalyst.

In the case of thiophene aldehydes and ketones, the general reaction may be represented as follows:

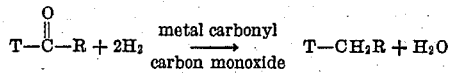

where T is a thiophene radical, substituted or unsubstituted, and where R may be hydrogen or an organic radical such as an aryl, alkyl, aralkyl, cycloaliphatic or heterocyclic radical.

In the case of a thenyl alcohol, the reaction may be represented generally as follows:

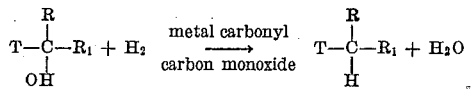

where T and R have the same significance as above and where $R_1$ may be hydrogen or an organic radical such as an aryl, alkyl, aralkyl, cycloaliphatic or heterocyclic radical and may be the same as, or different from R.

In each case, the oxygen atom of the oxygen-containing group must be attached to a carbon atom $\alpha$ to the thiophene nucleus. Thus, in the case of the aldehydes and ketones, the carbon atom of the carbonyl group,

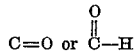

must be attached directly to the thiophene nucleus, as in 2-thiophene-aldehyde

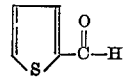

or as in methyl 2-thienyl ketone

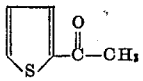

In the case of the thenyl alcohols which undergo reduction in accordance with the invention, the hydroxyl group must be attached to a carbon atom which is, in turn, attached directly to the thiophene nucleus as in 2-thenyl alcohol

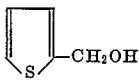

The side chain containing the oxygenated function may be attached to the thiophene nucleus in either the $\alpha$ or $\beta$ position. The thiophene nucleus itself may contain other substituents, such as alkyl, alkoxy, aryl, aryloxy, alkaryl, heterocyclic radicals, halide and the like, in addition to the oxygen-containing side chain which undergoes reduction in accordance with the invention.

As catalysts for the reaction, either a carbonyl of cobalt or of iron may be employed. Generally, the carbonyls of cobalt are to be preferred since they are less toxic and easier to handle, and likewise generally have higher hydrogenating activity. If desired, the cobalt or iron carbonyl may be prepared in advance of the reaction, and added to the reaction mixture as such. On the other hand, the carbonyl may be formed in situ under the reaction conditions. This may be accomplished by adding the finely-divided metal, or an organic or inorganic salt of the metal to the reaction mixture. Under the reaction conditions, the metal or the metallic salt as the case may be, reacts with carbon monoxide present in the reaction zone to form the cobalt or iron carbonyl which is the active catalyst for the reaction.

In the case of cobalt, for example, the catalyst may be added to the reaction mixture as cobalt chloride, cobalt carbonate, cobalt oxide, cobalt acetate, cobalt octoate, or cobalt stearate. From these salts, a cobalt carbonyl will form in the presence of hydrogen and carbon monoxide under the reaction conditions.

The metal carbonyl, either preformed, or formed in situ in the manner described above, ordinarily exists as a liquid in equilibrium with its vapor under the reaction conditions and is usually dissolved homogeneously in the reaction mixture. Thus, the mechanism of the catalysis is homogeneous rather than heterogeneous, which would explain the immunity of the reaction to sulfur and carbon monoxide poisoning which is usually present in heterogeneously catalyzed hydrogenation reactions.

Although the reaction mechanism is not completely understood, and it is not known for certain what form or forms of the carbonyl is the active catalyst in the reaction, it is known that some form of the carbonyl of either of these metals must be present in the reaction zone. In the case of cobalt, it is probable that the active catalyst is either dicobalt octacarbonyl $$[Co(CO)_4]_2$$

or cobalt hydrocarbonyl $HCo(CO)_4$. The existence of both of these compounds is possible under the reaction conditions.

Although only hydrogen takes an active part in the reduction, a mixture of hydrogen and carbon monoxide must be employed. The stoichiometric quantity of hydrogen for complete reduction must of course be present and generally higher yields are obtained when hydrogen in large excess of the stoichiometric amount is present. The carbon monoxide does not directly participate in the reaction, but its presence is necessary to insure the formation and stability of the metal carbonyl catalysts. That is, the partial pressure of carbon monoxide in the reaction zone must be at least sufficient to prevent the decomposition of the metal carbonyl catalyst at the reaction temperature employed or to assure its formation when the carbonyl is formed in situ. The presence of an amount of carbon monoxide less than the concentration necessary to assure the formation and stability of the metal carbonyl will poison the reaction rather than catalyze it.

With these considerations in mind, it is possible to employ mixtures of hydrogen and carbon monoxide containing these gases in ratios ranging from $.2H_2:1CO$ to $20H_2:1CO$. Generally, however, mixtures ranging from $1H_2:1CO$ to $4H_2:1CO$ are to be preferred.

The reaction temperature may vary between 70° and 250° C., and preferably between 110° and 200° C. Within these ranges, of course, the optimum temperature for any particular starting material will depend upon the nature of the starting material and the other reaction conditions. At temperatures below 70° C., the rate of reaction is generally too slow to obtain appreciable yields. Above 250° C., excessively high pressures are required to prevent the decomposition of the carbonyl catalyst, and other difficulties appear, such as the formation of excessive amounts of hydrocarbon gases through pyrolysis of the reactants.

Elevated pressures of at least 40 atm. are required for the reaction. Preferably, reaction pressures between 100 and 300 atm. are employed. There is no upper limit to the reaction pressure imposed by limitations of the reaction itself. Generally 10,000 atm. is considered to be the upper most limit of practical operation. As has been previously stated, the partial pressure of carbon monoxide in the reaction zone must be at least sufficient to prevent the decomposition of the metal carbonyl catalyst, or to insure its formation if it is to be formed in situ from the metal or the metallic salt.

The following specific examples are given to illustrate the invention.

*Example 1.—Reduction of 2-thiophenealdehyde*

A solution of 42 g. (0.37 mole) of 2-thiophenealdehyde (B. P. 88–90° at 20 mm.) in 35 ml. of n-hexane and 3.5 g. (0.014 mole) of cobalt acetate tetrahydrate $[Co(C_2H_3O_2)_2.4H_2O]$ were placed in the autoclave. Synthesis gas ($1H_2:1CO$) was added until the pressure reached 2300 p. s. i. This corresponded to approximately 2.5 moles of gas. The autoclave was heated with rocking, to 180° within 65 minutes. The maximum pressure obtained was 3100 p. s. i. at 170° C. The temperature of the autoclave was held at 180–185° for forty minutes, during which time the pressure dropped to 2520 p. s. i. This pressure drop corresponds to approximately 0.8 mole of gas, or 2.0 moles of gas per mole of aldehyde. The reaction vessel was cooled to 39° C.; the pressure at this temperature was 1590 p. s. i. The gases were then vented to the atmosphere.

The autoclave was then filled with hydrogen at 1300 p. s. i. and heated at 125° for forty minutes to decompose any residual dicobalt octacarbonyl. There was no pressure drop during this reaction. The autoclave was cooled and vented, and the products were washed from the autoclave with benzene. After filtration, the solution was distilled and yielded 9.3 g. (26%) of 2-methylthiophene, B. P. 55–56° C. at 111 mm. The infrared spectrum of this fraction was identical with that of an authentic sample of 2-methylthiophene.

Analysis of the residue from the distillation showed the presence of 17.4 g. of 2-thenyl alcohol and 7 g. of 2-thiophene aldehyde. This corresponds to a yield of 41% of 2-thenyl alcohol and 17% of recovered 2-thiophene aldehyde.

The reduction of 2-methyl thiophene may be represented by the following equation:

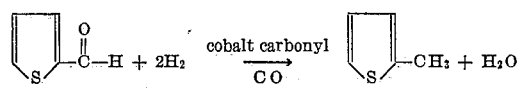

*Example 2.—Reduction of 2-acetylthiophene (methyl 2-thienyl ketone)*

One mole (126 g.) of methyl 2-thienyl ketone (B. P. 108–109 at 25 mm.), 3 g. of cobalt carbonate, and 1 g. of dicobalt octacarbonyl were placed in the autoclave. Synthesis gas ($2H_2:1CO$) was added until the pressure reached 3200 p. s. i. (3.6 moles of gas). The autoclave was heated with rocking, to 185° within 100 minutes. The maximum pressure obtained was 3900 p. s. i. at 113° C. The temperature of the autoclave was held at 180–185° C. for 2.5 hours, during which time the pressure dropped to 2400 p. s. i. This pressure drop corresponds to approximately 1.9 moles of gas. The reaction vessel was cooled to 25° C.; the pressure at this temperature was 1500 p. s. i. The gases were then discharged.

Distillation of the reaction products yielded 74.1 g. (66%) of 2-ethylthiophene, H. P. 135–136° C., and 31.5 g. (25%) of unreacted methyl 2-thienyl ketone, H. P. 98–99° C. at 18 mm.

The reduction may be represented as follows:

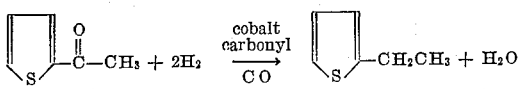

*Example 3.—Reduction of thenyl alcohol*

A solution of 0.36 moles (41.1 g.) of thenyl alcohol and 2.0 g. of dicobalt octacarbonyl in 50 ml. of benzene and 1 g. of cobalt carbonate were placed in the autoclave. Synthesis gas (2H$_2$:1CO) was added until the pressure reached 3500 p. s. i. (4.2 moles of gas). The autoclave was heated with rocking to 185° C. within 90 minutes. The maximum pressure obtained was 4450 p. s. i. at 180° C. The temperature of the autoclave was held at 180°–185° C. for 3.5 hours. The reaction vessel was cooled to 30° C.; the pressure at this temperature was 2500 p. s. i.

Distillation of the reaction products yielded 8.4 g. (24%) of 2-methylthiophene, B. P. 112–113° C., and 18.2 g. (49.5%) of 2-methyltetrahydrothiophene, B. P. 132–133° C. The reduction to 2-methylthiophene can be represented as follows:

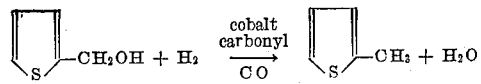

In the above examples, it will be noted that in the case of 2-thiophene aldehyde, some of the starting material, instead of being completely reduced, underwent only partial reduction, to produce the corresponding alcohol. When this occurs, generally the yield of completely reduced product can be increased by maintaining a high concentration of hydrogen in the reaction zone, and conversely, partial reduction to the alcohol can be favored by decreasing the concentration of hydrogen.

From the above description, it is apparent that the present invention provides a convenient and easy method for completely reducing oxygenated thiophene compounds where the oxygenated function is α to the thiophene nucleus. The reduction proceeds readily and in good yields while in accordance with prior art methods, this type of reduction can be accomplished only by tedious procedures resulting in very poor yields.

The catalysts for the reaction are cheap and, if formed in situ from the metal or a salt, need no preparation at all. Technical grade salts of cobalt or iron can be used without purification. Cheap hydrogenating gases such as unpurified water gas, or coke oven gas may be employed instead of expensive, carefully purified hydrogen.

It is to be understood that the above description, together with the specific examples and embodiments described, is intended merely to illustrate the invention, and that the invention is not to be limited thereto, nor in any way except by the scope of the appended claims.

We claim:

1. A method for completely reducing the oxygen-containing group in an oxygenated thiophene compound selected from the class consisting of thiophene aldehydes, thiophene ketones, and thenyl alcohols wherein the oxygen atom of the oxygen-containing group is attached to a carbon atom α to the thiophene nucleus comprising the steps of reacting said compound with hydrogen in the presence of a catalyst selected from the group consisting of carbonyls of cobalt and iron, at a temperature of from 70° to 250° C., under a pressure of at least 40 atm., while maintaining a concentration of carbon monoxide in the reaction zone at least sufficient to prevent the decomposition of said carbonyl catalyst under the reaction conditions.

2. A method in accordance with claim 1 in which the catalyst is a cobalt carbonyl.

3. A method in accordance with claim 1 in which the catalyst is a cobalt carbonyl and in which the reaction zone is maintained at a temperature of from 110° to 200° C. and under a pressure of from 100 to 300 atm.

4. A method for completely reducing the aldehyde group in a thiophene aldehyde wherein the aldehyde group is α to the thiophene nucleus comprising the steps of reacting said compound with hydrogen in the presence of a catalyst selected from the group consisting of carbonyls of cobalt and iron, at a temperature of from 70° to 250° C., and under a pressure of at least 40 atm., while maintaining a concentration of carbon monoxide in the reaction zone at least sufficient to prevent the decomposition of said carbonyl catalyst under the reaction conditions.

5. A method in accordance with claim 4 in which said catalyst is a cobalt carbonyl, and in which the reaction zone is maintained at a temperature of from 110° to 200° C. and under a pressure of from 100 to 300 atm.

6. A method for completely reducing the ketone group in a thiophene ketone wherein the ketone group is α to the thiophene nucleus comprising the steps of reacting said compound with hydrogen in the presence of a catalyst selected from the group consisting of carbonyls of cobalt and iron, at a temperature of from 70° to 250° C., and under a pressure of at least 40 atm., while maintaining a concentration of carbon monoxide in the reaction zone at least sufficient to prevent the decomposition of said carbonyl catalyst under the reaction conditions.

7. A method in accordance with claim 6 wherein the catalyst is a cobalt carbonyl and the reaction zone is maintained at a temperature of from 110° to 200° C. and under a pressure of from 100 to 300 atm.

8. A method for completely reducing the hydoxyl group in thenyl alcohol wherein the hydroxyl group is attached to a carbon atom which is α to the thiophene nucleus comprising the steps of reacting said compound with hydrogen in the presence of a catalyst selected from the group consisting of carbonyls of cobalt and iron, at a temperature of from 70° to 250° C., and under a pressure of at least 40 atm., while maintaining a concentration of carbon monoxide in the reaction zone at least sufficient to prevent the decomposition of said carbonyl catalyst under the reaction conditions.

9. A method in accordance with claim 8 in which said catalyst is a cobalt carbonyl, and in which the reaction zone is maintained at a temperature of from 110° to 200° C. and under a pressure of from 100 to 300 atm.

IRVING WENDER.
MILTON ORCHIN.

No references cited.